(12) United States Patent
Brice

(10) Patent No.: US 10,598,198 B2
(45) Date of Patent: Mar. 24, 2020

(54) MOUNT DEVICE FOR SWIMMING STARTING BLOCK

(71) Applicant: Keith Michael Brice, Lakeport, CA (US)

(72) Inventor: Keith Michael Brice, Lakeport, CA (US)

(*) Notice: Subject to any disclaimer, the term of this patent is extended or adjusted under 35 U.S.C. 154(b) by 0 days.

(21) Appl. No.: 16/164,784

(22) Filed: Oct. 18, 2018

(65) Prior Publication Data

US 2019/0048905 A1     Feb. 14, 2019

Related U.S. Application Data

(63) Continuation-in-part of application No. 15/449,509, filed on Mar. 3, 2017, now Pat. No. 10,221,876.

(60) Provisional application No. 62/389,691, filed on Mar. 7, 2016.

(51) Int. Cl.

| | |
|---|---|
| *F16B 2/04* | (2006.01) |
| *E04H 4/14* | (2006.01) |
| *A63B 69/12* | (2006.01) |
| *E04H 12/22* | (2006.01) |
| *A63B 5/10* | (2006.01) |
| *F16B 5/06* | (2006.01) |

(52) U.S. Cl.
CPC ............... *F16B 2/04* (2013.01); *A63B 5/10* (2013.01); *A63B 69/12* (2013.01); *E04H 4/14* (2013.01); *E04H 12/2269* (2013.01); *A63B 2244/203* (2013.01); *F16B 5/0642* (2013.01)

(58) Field of Classification Search
CPC .......... F16B 13/066; F16B 2/04; A63K 3/023; A63B 69/12; A63B 5/10; E04H 4/144; E04H 4/14; E04H 12/2269; F16M 13/005; F16M 13/02
USPC ......... 248/412, 686; 403/374.1, 374.3, 374.4
See application file for complete search history.

(56) References Cited

U.S. PATENT DOCUMENTS

| | | | | |
|---|---|---|---|---|
| 1,743,143 A | * | 1/1930 | Johnson ............. | B60B 33/0002 16/21 |
| 2,051,251 A | * | 8/1936 | Epstein ............... | B60B 33/0002 16/38 |
| 3,040,370 A | * | 6/1962 | Ford ....................... | B60B 33/08 16/31 R |

(Continued)

*Primary Examiner* — Muhammad Ijaz
(74) *Attorney, Agent, or Firm* — Entralta P.C.; Justin G. Sanders; Peter D. Weinstein

(57) ABSTRACT

A mount device is disclosed for securing a swimming starting block to a floor. In at least one embodiment, the mount device provides an upper mount conduit engagable with the starting block and sized for at least partially extending into a receiver conduit in the floor. A lower mount conduit is positioned below the upper mount conduit and has an outer diameter or width sized for being completely positioned within the receiver conduit. An expansion bolt extends through respective substantially coaxially aligned bores of each of the upper mount conduit and the lower mount conduit, each of the bores having a diameter that is relatively larger than a diameter the bolt. Upon tightening the expansion bolt, the lower mount conduit is urged along an angled common axis toward the upper mount conduit, such that opposing long outside surfaces of the upper mount conduit and lower mount conduit are urged in opposite, substantially horizontal directions, creating a frictional engagement within the receiver conduit.

18 Claims, 14 Drawing Sheets

(56) References Cited

U.S. PATENT DOCUMENTS

| | | | | |
|---|---|---|---|---|
| 3,063,765 A | * | 11/1962 | Huff | A47B 13/021 |
| | | | | 248/188.8 |
| 3,194,467 A | * | 7/1965 | Goonan | H01P 1/04 |
| | | | | 228/50 |
| 3,523,688 A | * | 8/1970 | Kinsman | A63B 5/10 |
| | | | | 482/31 |
| 3,528,691 A | * | 9/1970 | Matich, Jr. | F16D 1/0888 |
| | | | | 403/356 |
| 4,480,287 A | * | 10/1984 | Jensen | H05K 7/1404 |
| | | | | 361/707 |
| 4,603,758 A | * | 8/1986 | Pettit | E04H 4/144 |
| | | | | 182/106 |
| 4,824,303 A | * | 4/1989 | Dinger | F16B 2/14 |
| | | | | 254/104 |
| D509,277 S | | 9/2005 | Morral Gispert | |
| 7,058,994 B2 | | 6/2006 | Weimer et al. | |
| 7,543,415 B2 | * | 6/2009 | Svendsen | A63B 5/10 |
| | | | | 403/374.4 |
| 8,661,767 B2 | | 3/2014 | Svendsen | |
| 9,585,488 B1 | * | 3/2017 | Kalista | A47D 1/0085 |
| 10,221,876 B1 | * | 3/2019 | Brice | F16M 13/005 |
| 2004/0063545 A1 | * | 4/2004 | Rosenberg | A63B 5/10 |
| | | | | 482/30 |
| 2007/0123392 A1 | * | 5/2007 | Hagerty | A63B 5/10 |
| | | | | 482/30 |
| 2013/0252788 A1 | | 9/2013 | Kaiel et al. | |
| 2019/0048905 A1 | * | 2/2019 | Brice | F16B 2/04 |

* cited by examiner

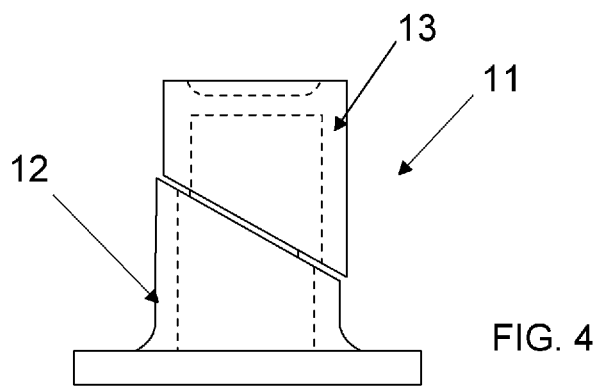
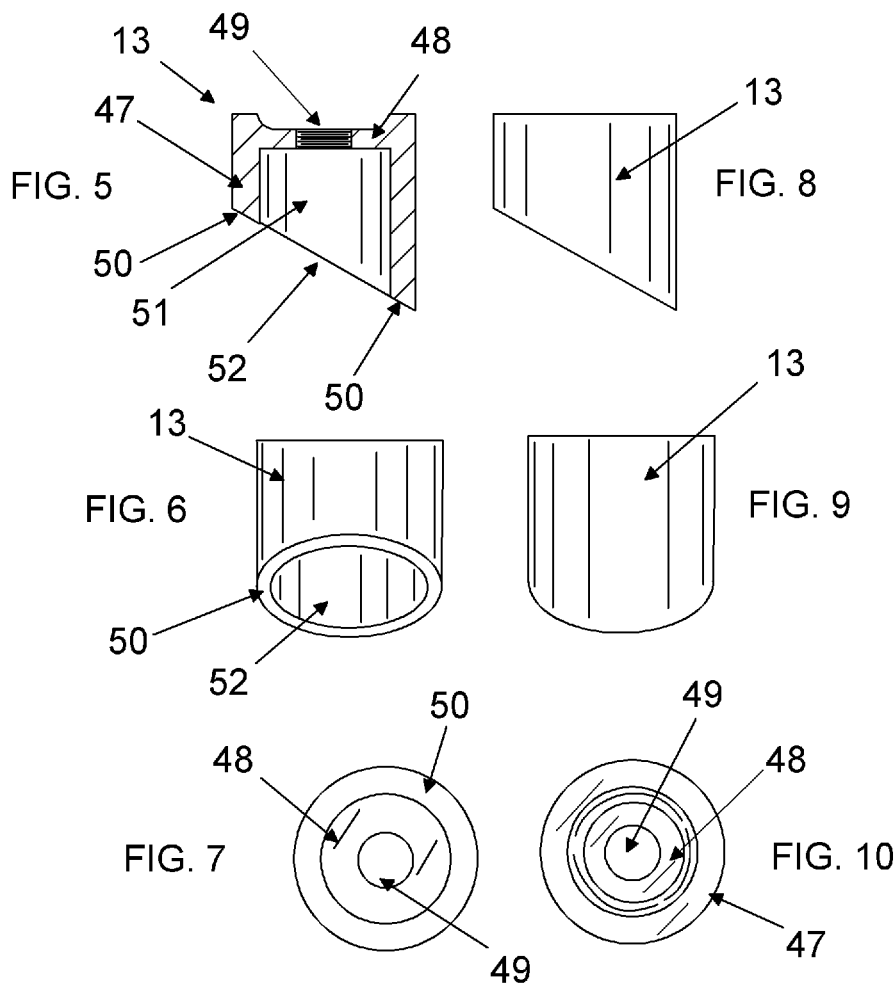

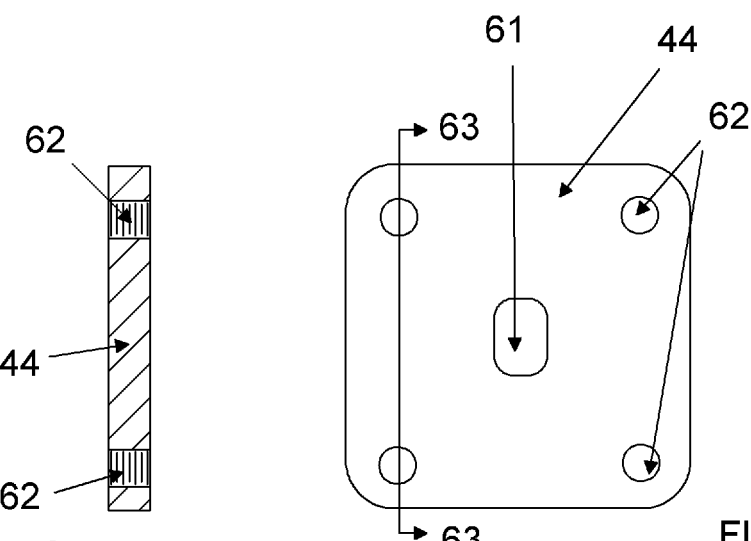
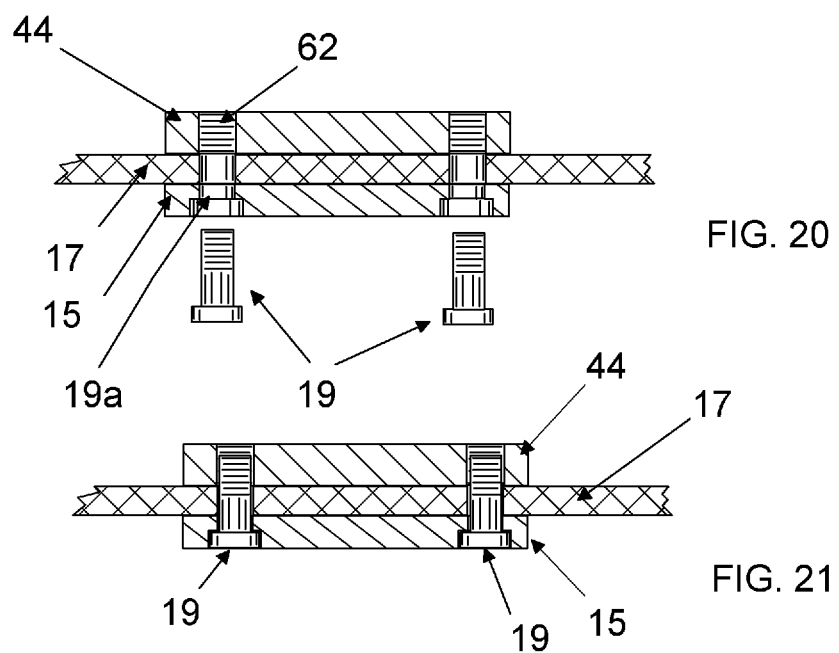

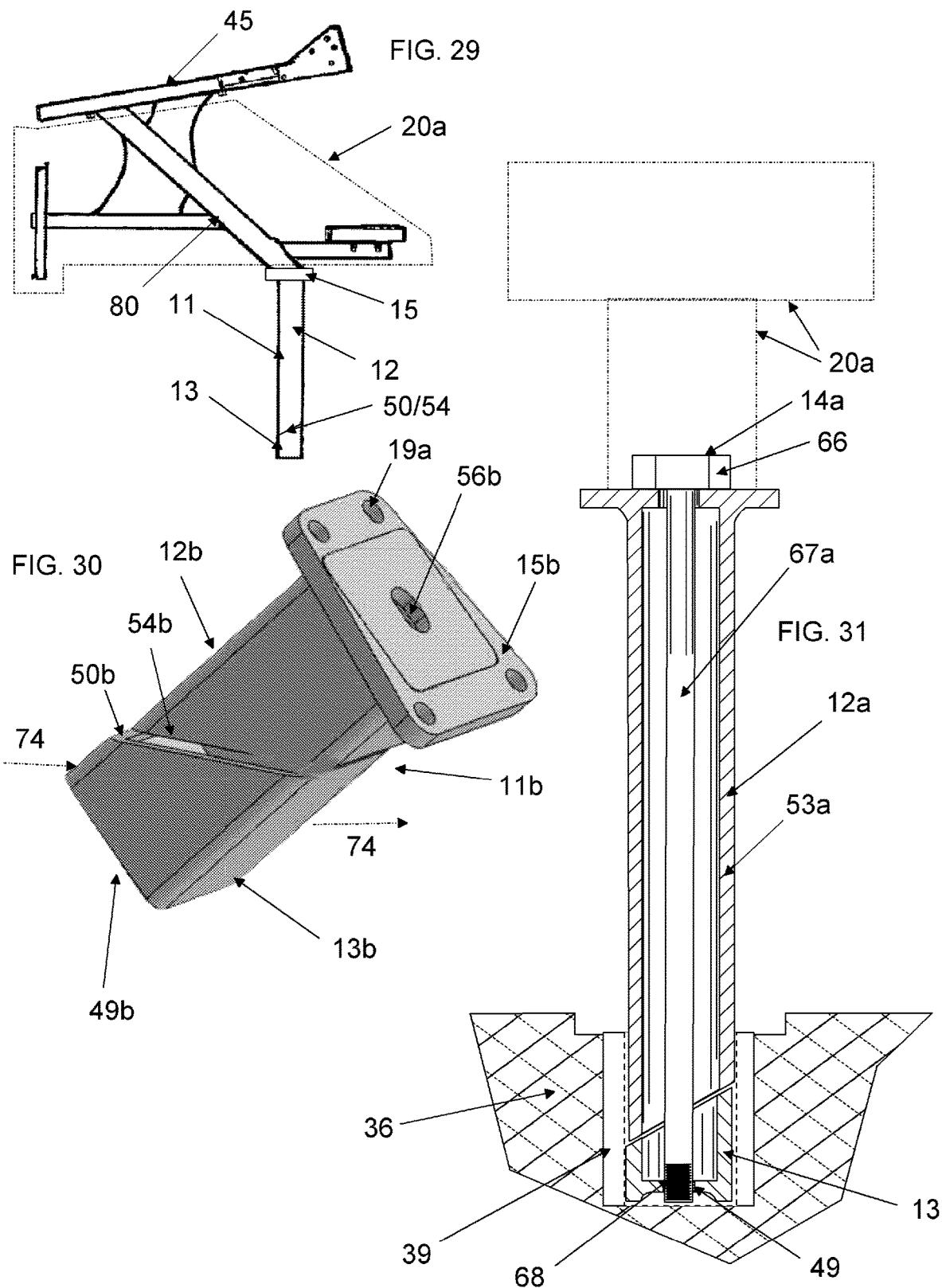

MOUNT DEVICE FOR SWIMMING STARTING BLOCK

RELATED APPLICATIONS

This is a continuation-in-part application and so claims the benefit pursuant to 35 U.S.C. § 120 of a prior filed and co-pending U.S. non-provisional patent application Ser. No. 15/449,509, filed on Mar. 3, 2017, which itself claims priority pursuant to 35 U.S.C. § 119(e) to and is entitled to the filing date of U.S. provisional patent application Ser. No. 62/389,691, filed on Mar. 7, 2016. The contents of the aforementioned applications are incorporated herein by reference.

BACKGROUND

The subject of this patent application relates generally to mounts for diving platforms and swimming starting platforms, and more particularly to a mount device for simplifying the installation and removal of a swimming starting block from a pool deck or similar surface.

Applicant hereby incorporates herein by reference any and all patents and published patent applications cited or referred to in this application.

By way of background, diving platforms and swimming starting platforms (hereinafter collectively referred to as "starting blocks"), such those engaged in competitive swimming racing who must dive into a pool from a short distance above it, are well known in the art. U.S. Pat. D509277 discloses a representative diving platform or starting block having a lower support section for connection to a concrete surface at a base plate and connection to the diving platform at a topmost surface of the support section. An alternate form of the same conceptual diving platform is found in US Publication 20130252788, where a housing or body of the support structure in the '277 patent with a base plate is substantially replaced in function with a single rectangular conduit extends downward from an upper expanded metal frame supporting the diving platform. The single rectangular conduit 12 of the '788 application is sufficient, when inserted into a receiving piece fixed in concrete, to support the requirements of the entire diving platform or starting block, where structural elements extend up from a vertical element of square conduit 12 to support diving platform 18. It is well known in the art to simply insert the lowest end of square conduit 12 into a square conduit whose bore is slightly larger than the outside surface of the lowest end of square conduit 12, which has resulted in substantial problems in failure of the entire platform to be stable enough for divers to launch from a secure instead of a wobbling platform. U.S. Pat. No. 7,058,994 attempts, without success, to remedy this problem with stabilizing pegs.

One attempt at solving the well known wobbling problem is found in U.S. Pat. No. 8,661,767, wherein a wedge is used to cause a wedge to be formed between the outside of the square conduit supporting the diving platform and the inside of the square conduit receiving piece. This device cannot be used with round conduits and will eventually loosen with repeated use.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a mount device for securing a swimming starting block to a floor of a pool deck, the starting block comprising a diving platform supported underneath by a support structure. In at least one embodiment, the mount device provides an upper mount conduit having an outer diameter or width sized for at least partially extending into an upwardly opening receiver conduit provided by the floor, an upper end of the upper mount conduit providing a support plate engagable with the support structure of the starting block. A lower mount conduit is positioned below the upper mount conduit and has an outer diameter or width sized for being completely positioned within the receiver conduit. An expansion bolt has a shaft that extends through a respective substantially coaxially aligned bore of each of the upper mount conduit and the lower mount conduit, each of the bores having a diameter that is relatively larger than a diameter the shaft. The upper mount conduit and lower mount conduit are generally aligned end to end with a common axis, forming an angled interface between the upper mount conduit and the lower mount conduit, along with opposing long outside surfaces of each of the upper mount conduit and lower mount conduit. Upon tightening the expansion bolt, the lower mount conduit is urged along the common axis toward the upper mount conduit, such that the opposing long outside surfaces of the upper mount conduit and lower mount conduit are urged in opposite, substantially horizontal directions, thereby creating a frictional engagement with an inside wall of the receiver conduit.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 4 is a side view of the mount device shown in FIG. 1 with upper and lower mount conduits, in accordance with at least one embodiment;

FIG. 5 is a side and cutaway view of the lower mount conduit, in accordance with at least one embodiment;

FIGS. 6, 7, 8, 9 and 10 are respectively right, top, front, left, and bottom side views of the lower mount conduit, in accordance with at least one embodiment;

FIG. 18 is a top view of a sandwich plate shown in FIG. 1, in accordance with at least one embodiment;

FIG. 19 is a cross-sectional view taken along line 63-63 of FIG. 18;

FIGS. 20 and 21 are sectional views showing the plate of FIG. 19 and the plate of FIG. 13 in relation to a section of a base plate of the starting block of FIG. 1 with bolts oriented to engage the three plates, in accordance with at least one embodiment;

FIG. 29 is a side view of an exemplary starting block using a single support conduit to support the rest of an intervening frame and inclined diving platform, whereby an upper mount conduit length is extended downward from that shown in FIG. 17 to be adapted to that form of the starting block, in accordance with at least one embodiment;

FIG. 30 is a perspective view of a further exemplary mount device, with the upper and lower mount conduits each having a rectangular shape in cross section, in accordance with at least one embodiment;

FIG. 31 is a sectional view of the vertical mounting portion conduit for the embodiment of FIG. 29 for both round, rectangular or polygonal upper and lower mount conduits, in accordance with at least one embodiment;

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
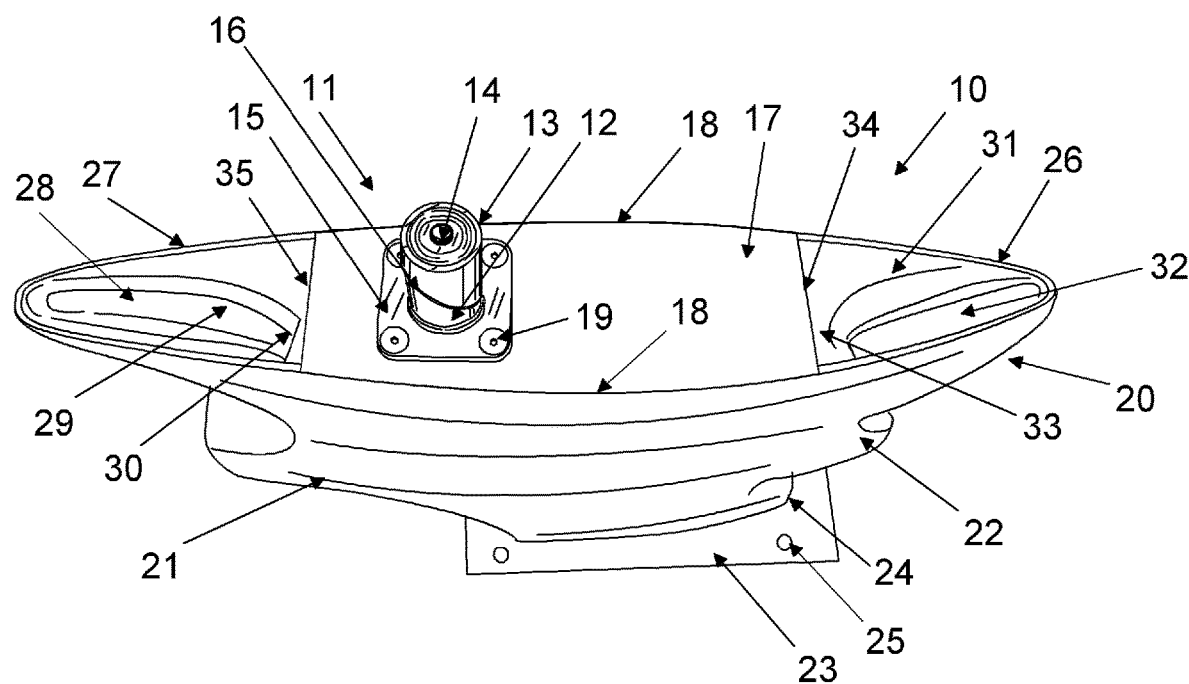
FIG. 1 is a top perspective view of an exemplary starting block having an exemplary mount device mount fixed to a base plate of the starting block, in accordance with at least one embodiment.

Turning now to FIG. 1, there is shown a top perspective view of a bottom of a starting block 10 having an exemplary mount device 11 fixed to a base plate 17. A fiberglass shell 20 comprises a hollow shell whose lowest edges 26 and 27 generally define, with base plate 17, the surfaces intended to rest upon a flat concrete surface at poolside. Mount device 11 extends downward from base plate 17 so that all of lower mount conduit 13 and at least a portion of upper mount section 12 are located in a receiver conduit 39 (shown in FIGS. 2 and 3). Openings 30 and 31 are defined respectively by edges 27/35 and edges 26/34. Shell 20 comprises side surfaces 21 and 22 that rise to connect diver's platform connection plate 23, having holes 25 for bolt connections to any of a wide range of diver's platforms available in the prior art. Support plate 17 connects with shell 20 at edges 18. Inside surfaces 28, 29, 32 and 33 show the inside of the fiberglass shell 20. An opening is provided in plate 23 so that, when the starting block 10 is arranged with the mount device 11 inserted into the receiver conduit, a user can reach through the opening in plate 23 and through shell 20 to reach the top of a bolt 14, whose lowest end is shown in FIG. 1. Upper mount conduit 12 also comprises support plate 15, which is secured to plate 17 by bolts 19. An angled interface 15 is formed between opposing faces of upper mount conduit 12 and lower mount conduit 13. Broken lines show a preferable slot 21a for access from the outside of the fiberglass shell to the top of bolt 14.

Figure 2:
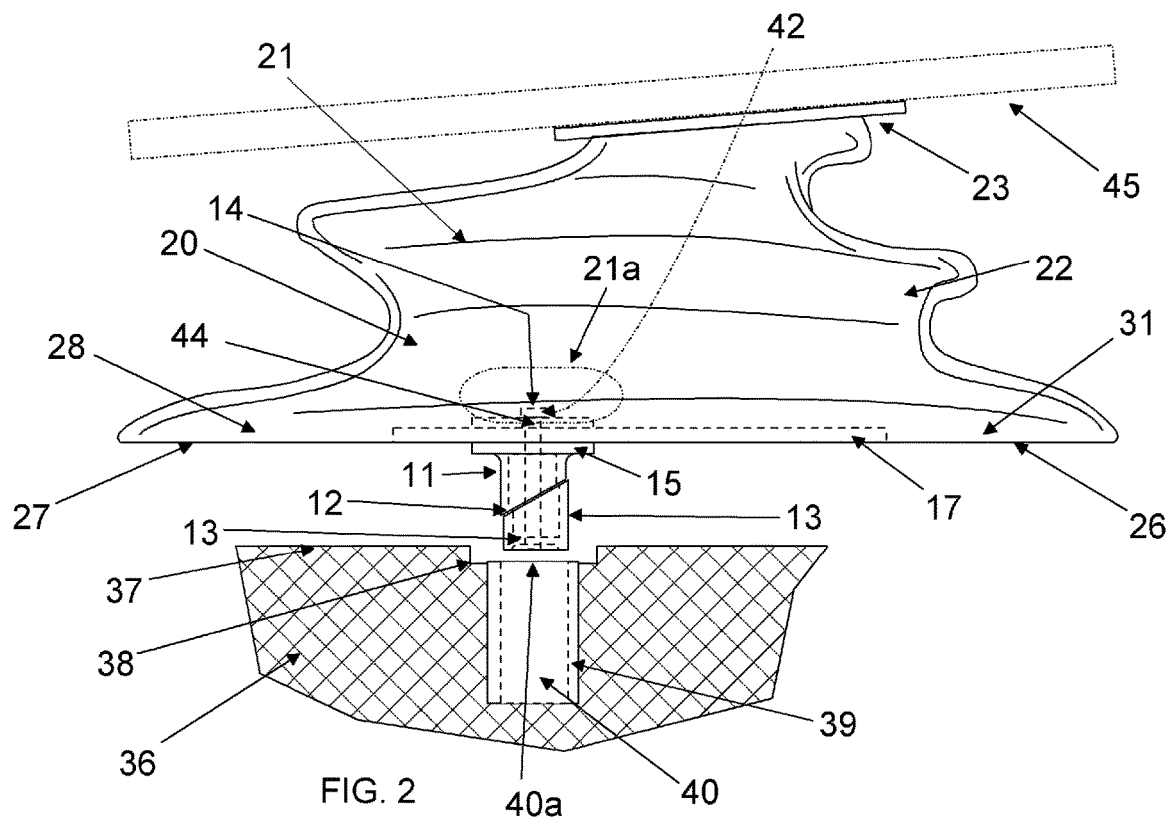
FIG. 2 is a side view of the starting block of FIG. 1 with the mount device oriented for insertion into a receiving piece fixed in a solid surface, in accordance with at least one embodiment.

FIG. 2 is a side view of the starting block 10 of FIG. 1 with the mount device 11 oriented for insertion into a receiving conduit 39 defining a bore 40, where receiving conduit 39 is fixed in a solid, typically, concrete, material 36 and has a top opening 40a. Preferably, cutout 38 is made in material 36 to receive plate 15. Broken lines show additional features of the invention, namely, plate 44 that lies above plate 15 so that joining the two with plate 17 between them secures the mount device 11 to the shell 20. Additionally, bolt 14 is shown joining the three plates 15, 17 and 44 with upper mount conduit 12 and lower mount conduit 13. Path 42 is generally the direction a user will direct their arm with a rotation tool such as a crescent or boxed end wrench to adjust the top of bolt 14. Broken lines generally indicate a location of a diving platform 45 that would be attached to plate 23.

Figure 3:
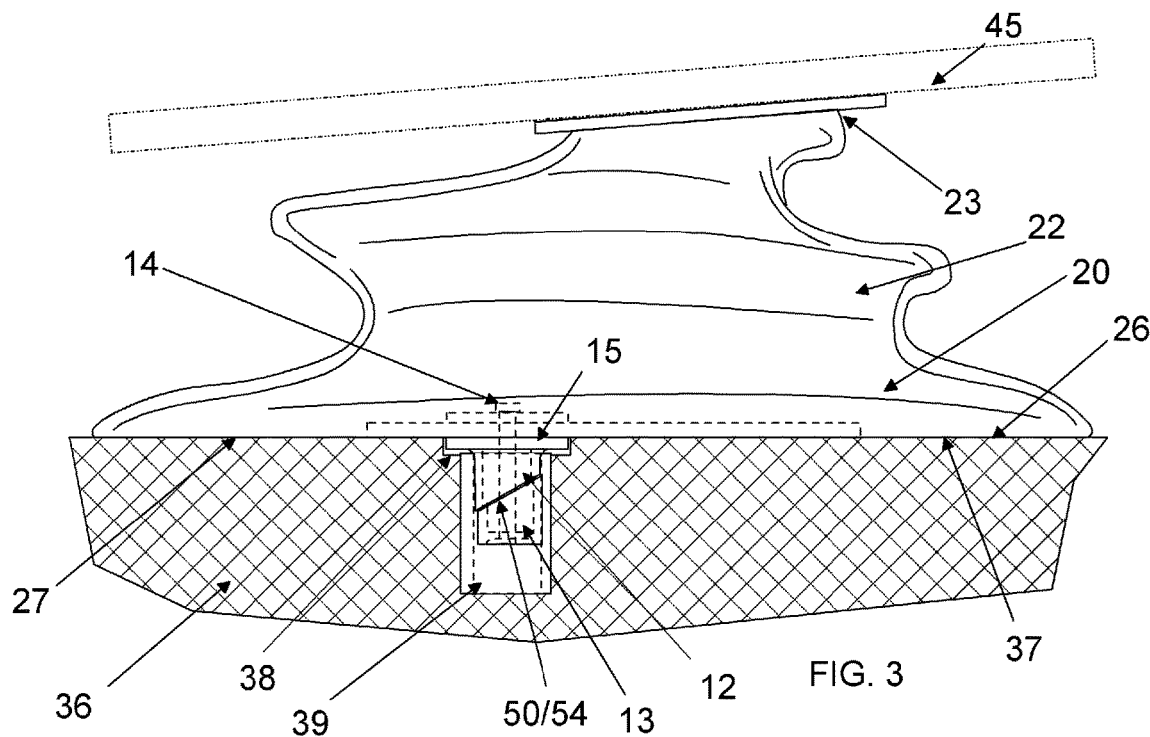
FIG. 3 is a side view of the starting block of FIG. 2 with the mount device inserted and securely fixed into the receiving piece fixed in a solid surface, in accordance with at least one embodiment.

FIG. 3 is a side view of the starting block of FIG. 2 with the mount device 11 inserted and securely fixed, according to the invention, into the receiving conduit 39 in the following general description: the starting block comprising a diving platform supported underneath by a support structure (such as shell 20), such that the mount device 11 extends down from the support structure (such as from base plate 17) and is adapted to engage a receiver conduit (such as receiver conduit 39) having an upward opening (such as opening 40) and is fixed in rigid material (such as material 36) forming a floor about the upward opening; the mount device 11 comprising an upper mount conduit 12 and a lower mount conduit 13 generally aligned end to end with a common axis, forming an angled interface (such as interface 50/54 of FIG. 23) between the upper mount conduit 12 and the lower mount conduit 13 so that, when the upper mount conduit 12 is urged along the common axis toward the lower mount conduit 13, long outside surfaces of the upper mount conduit 12 and lower mount conduit 13 are urged in opposite horizontal directions; an expansion bolt (such as bolt 14) that extends through bores of and connects the upper mount conduit 12 and lower mount conduit 13 so that rotation means (such as a hexagonal end of bolt 14) connected with the expansion bolt above a top end of the upper mount conduit 12 (such as above and compressing upon an upper surface of plate 44) can be rotated to cause the upper mount conduit 12 and lower mount conduit 13 to be urged toward each other along their common axis and their long outside surfaces are urged against and engage inside walls of the receiver piece; and the mount device 11 located in the receiver conduit, which is achieved by inserting the lower mount conduit 13 and a portion of the upper mount conduit 12 into the receiving piece.

FIG. 4 is side view of the mount device 11 shown in FIG. 1 with upper mount conduit 12 and lower mount conduit 13.

FIG. 5 is a side and cutaway view of lower mount conduit 13, as related to the location of one of the two separate pieces in FIGS. 2 and 3, comprising a cylindrical wall 47 defining an internal space 51 and upper opening 52, which is further defined by lower interface surface 50. Plate 48 is secured to inside walls of wall 47 and defines a threaded bore 49, which is adapted to threadedly engage bolt 14, as shown in FIG. 1. Walls 47 may extend upward or downward from plate 48, depending on requirements of a particular installation for the mount device 11. FIGS. 6, 7, 8, 9 and 10 are respectively right, top, front, left, and bottom side views of the lower mount conduit, as related to the location of one of the two separate pieces in FIGS. 2 and 3.

Figure 11:
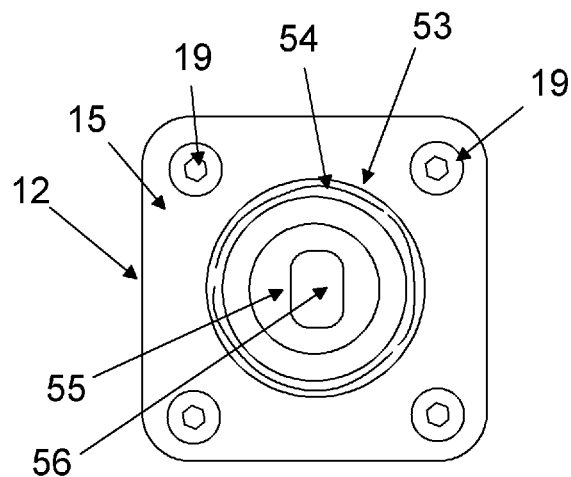
FIG. 11 is a top view of an upper mount conduit and showing connection bolts for an integral connection plate, in accordance with at least one embodiment.
Figure 14:
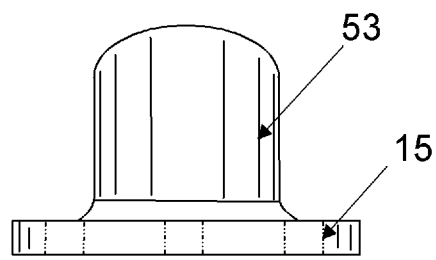
FIG. 14 is a left side view of the upper mount conduit of FIG. 12, in accordance with at least one embodiment.
Figure 15:
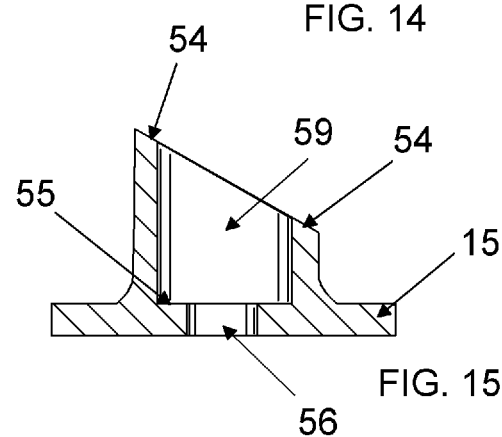
FIG. 15 is a cross-sectional view taken along line 57-57 of FIG. 12.
Figure 12:
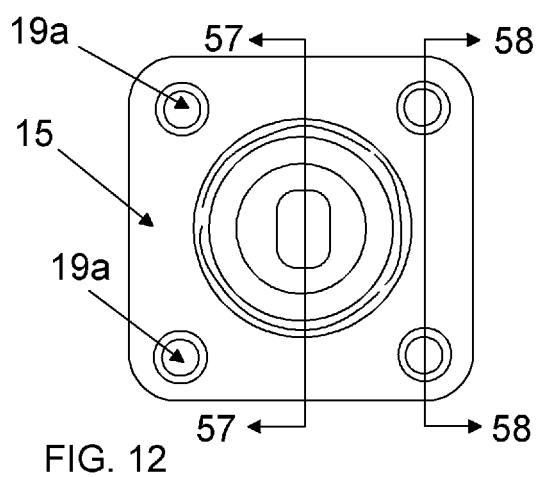
FIG. 12 is a top view of an upper mount conduit and without connection bolts for an integral connection plate, in accordance with at least one embodiment.
Figure 16:
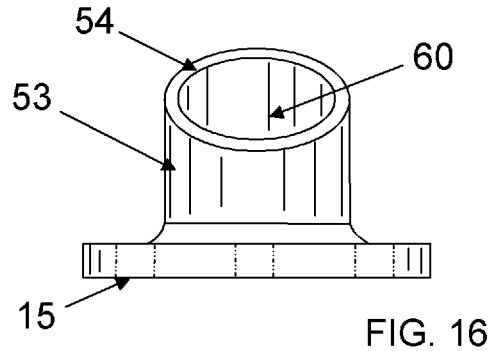
FIG. 16 is a right side view of the upper mount conduit of FIG. 11, in accordance with at least one embodiment.

FIG. 11 is a top view of an upper mount conduit 12, as related to the location of one of the two separate pieces in FIGS. 2 and 3 and showing connection bolts for an integral connection plate 15. Referring to FIGS. 11-17, upper mount conduit 12 comprises cylindrical walls 53 and define an internal space 59 with an opening 60, which is further defined by interface surface 54. Plate 15 extends into and blocks space 59 at plate 55, which defines a bolt slot 56. Bolts 19 are located in countersunk bolt holes 19a to connect plate 15 to plate 44.

Referring to FIGS. 18 and 19, a top sandwich plate 44 comprises threaded bolt holes 62 and a bolt slot 61.

Figure 13:
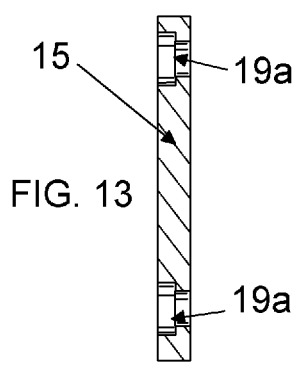
FIG. 13 is a cross-sectional view taken along line 58-58 of FIG. 12.

FIG. 20 shows the plate 44 of FIG. 19 and the plate 15 of FIG. 13 in relation to a section of a base plate 17 of the starting block of FIG. 1 with bolts 19 oriented to engage the three plates.

FIG. 21 is the assembly of FIG. 20 with said bolts 19 securing the three plates 15, 17, and 44 together.

Figure 22:
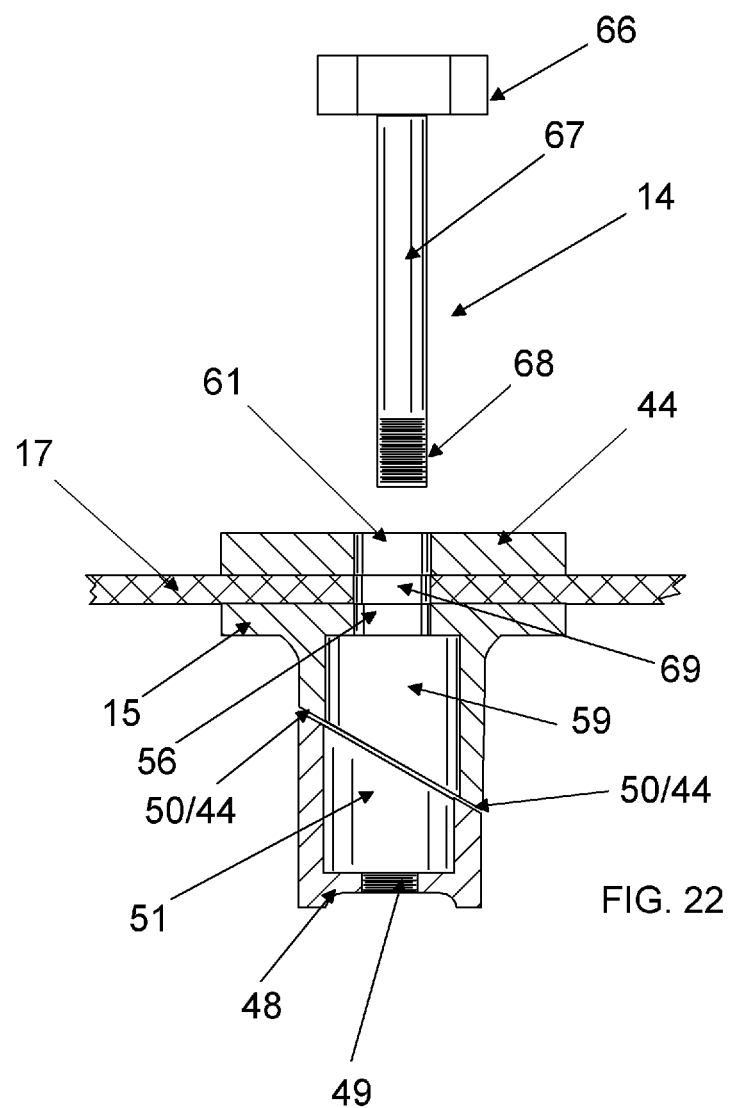
FIG. 22 is a further sectional view of the assembly of plates of FIG. 21, with an alignment of the upper and lower mount conduits to all be joined by a threaded bolt, in accordance with at least one embodiment.

FIG. 22 is an assembly of the plates 15, 17 and 44 of FIG. 21 aligning slots in said plates and alignment of the upper mount conduit 12 and lower mount conduit 13 to all be joined by a threaded bolt 14, comprising a hexagonal head 66, a shaft 67 and threaded end 68. Angled interface 50/54 is preferably an acute angle of from 80 degrees to 15 degrees, and, more preferably, from 70 degrees to 30 degrees with respect to a generally common axis of upper mount conduit 12 and lower mount conduit 13 as shown.

Figure 23:
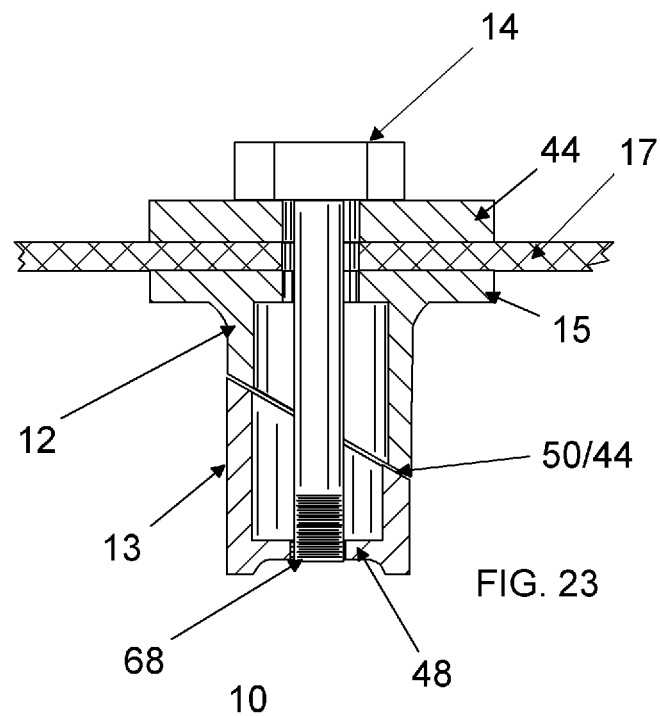
FIG. 23 is a further sectional view of the assembly of FIG. 22, with the threaded bolt joining the three plates and upper and lower mount conduits, in accordance with at least one embodiment.

FIG. 23 shows the assembly of FIG. 22 with the threaded bolt 14 joining the three plates and upper and lower mount conduits.

Figure 24:
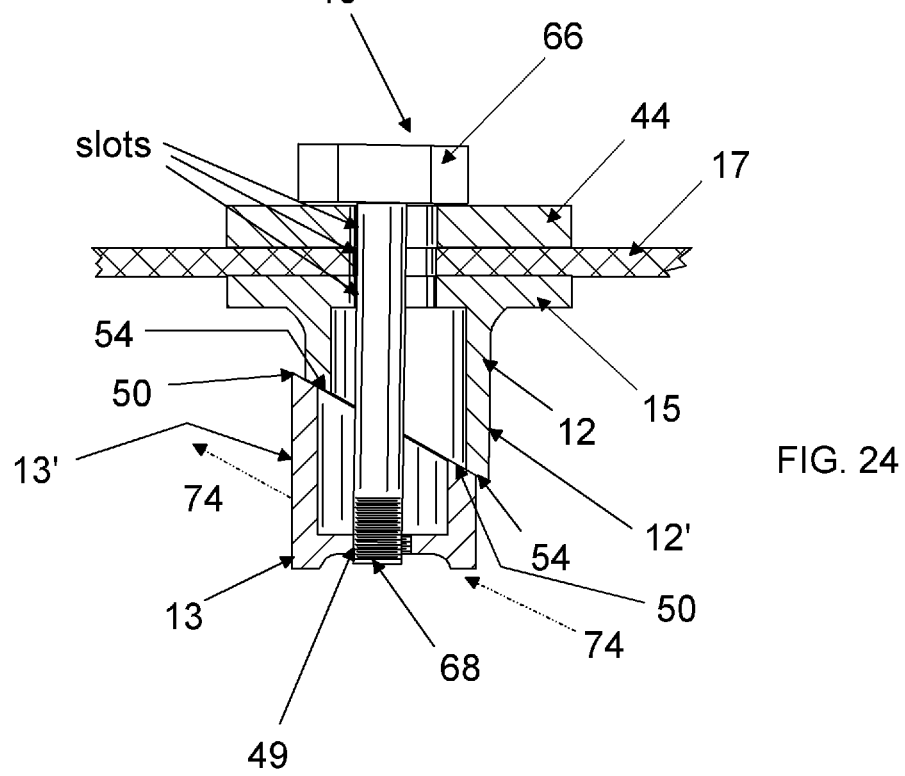
FIG. 24 is a further sectional view of the assembly of FIG. 23, with the threaded bolt urging interface surfaces of the upper and lower mount conduits to slide against each other to force long sides of the upper and lower mount conduits in opposite horizontal directions, in accordance with at least one embodiment.

FIG. 24 shows the assembly of FIG. 23 whereby head 66 of threaded bolt 14 has been rotated in a clockwise direction, urging interface surface 54 of the upper mount conduit 12 and the interface surface 50 of the lower mount conduit to slide against each other, generally along path 74, to force long sides 12' of the upper mount conduit 12 and long sides 13' of lower mount conduit 13 in opposite horizontal directions. Bolt 14 is slightly inclined by this action, which inclination is accommodated by the slots in FIG. 24.

Figures 25, 26, 27:
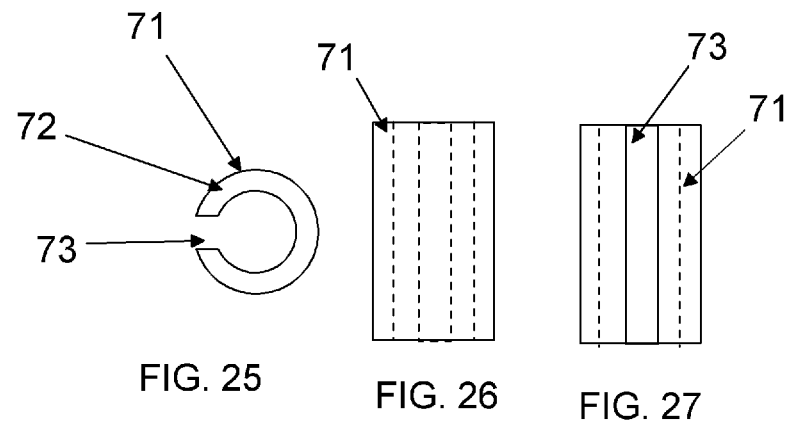
FIGS. 25, 26 and 27 respectively show top, right and left side views of a support insert to be lodged within the internal spaces defined by the inner walls of the upper and lower mount sections, in accordance with at least one embodiment.

FIGS. 25, 26 and 27 respectively show top, right and left side views of a resilient support insert 71 with walls 72 defining longitudinal slot 73 so that the support insert 71 can be compressed as it is lodged within the internal spaces defined by the inner walls of the upper and lower mount conduits. In at least one embodiment, the support insert is made out of rubber or plastic; however, in further embodiments, the support insert may be constructed out of any other resilient material or combination of materials (now known or later developed) capable of substantially carrying out the functionality described herein.

Figure 28:
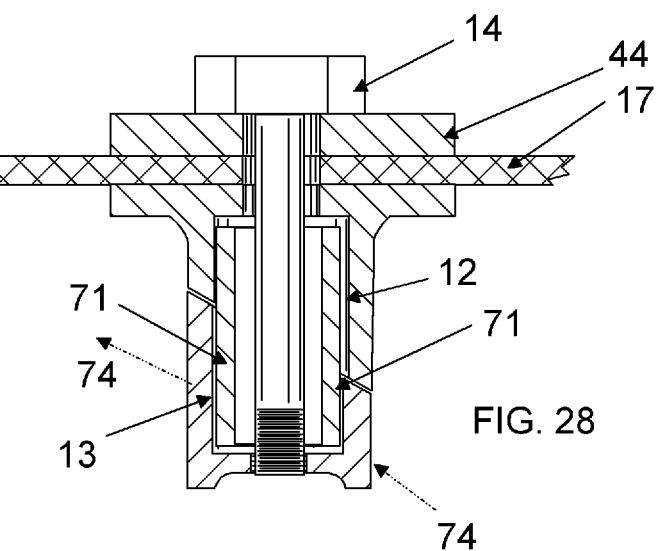
FIG. 28 is a further sectional view of the assembly of FIG. 23, showing use of the support insert of FIG. 25, in accordance with at least one embodiment.

FIG. 28 is the assembly of FIG. 23 showing use of the support insert 71 of FIG. 25.

Figure 17:
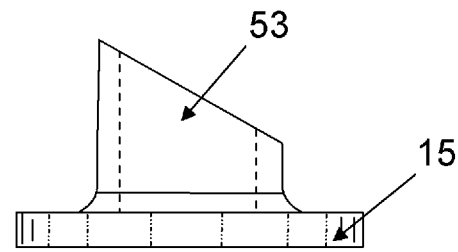
FIG. 17 is a front view of the upper mount conduit of FIG. 11, in accordance with at least one embodiment.

FIG. 29 is a side view of a representative starting block with a diving platform 54 with a support structure 20a within broken lines, which is structurally equivalent to shell 20, of FIG. 1, using a single support elongated upper mount conduit 12a to support the rest of an intervening frame and inclined diver's platform, whereby an upper mount conduit length is extended downward from that shown in FIG. 17 to be adapted to that form of the starting block. Plate 15 is adapted to be welded to conduit 80 to leave open a top section of plate 15 to provide access to rotation means above plate 15. The conduits of FIG. 29 or of the invention generally may be round, rectangular or polygonal in cross-section and are preferably steel or stainless steel. In an alternate form of this embodiment angled interface 50/54 may be from side to side relative to the starting block instead of front to back, as shown in FIG. 29.

FIG. 30 shows a rectangular conduit form of the mount device 11b, showing an upper mount conduit 12b having an angled interface surface 54b, an lower mount conduit 13b having an angled interface surface 50b, a support plate 15b with slot 56b, where the end section of lower mount conduit is sealed with a plate similar to that of plate 48 with threaded hole 49 of FIG. 24 receive a threaded end 68 of bolt 14.

FIG. 31 is a side and cutaway view of the vertical mounting portion conduit for that embodiment of FIG. 29 for both round, rectangular or polygonal in cross-section upper and lower mount conduits, comprising an elongated wall 53 of upper mount conduit 12a, requiring an extension of shaft 67a of bolt 14a.

Figure 32:
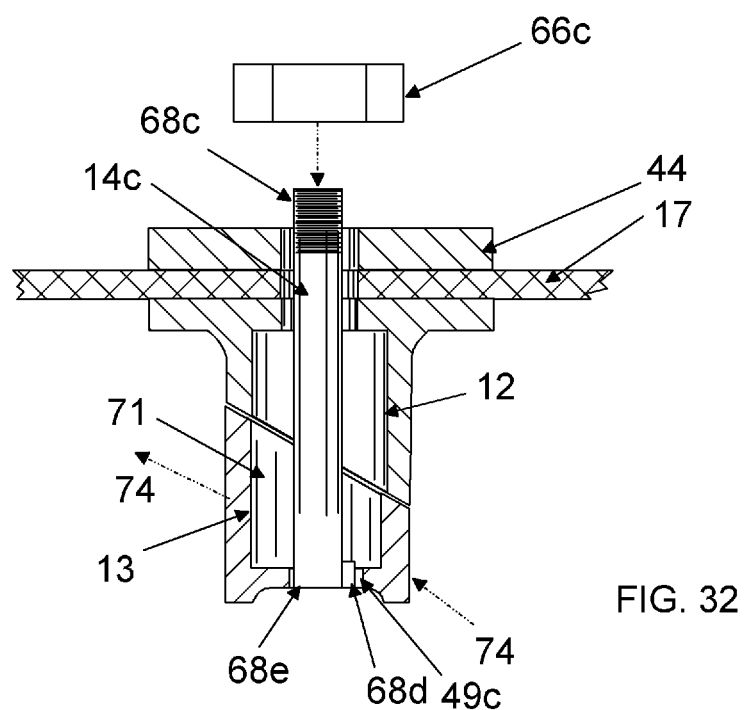
FIG. 32 is a sectional view of a further exemplary mount device, wherein the bolt is fixed against rotating in the lower mount conduit and extends upward with accessible threads at upper end out from a support plate in the upper mount conduit, in accordance with at least one embodiment.
Figure 33:
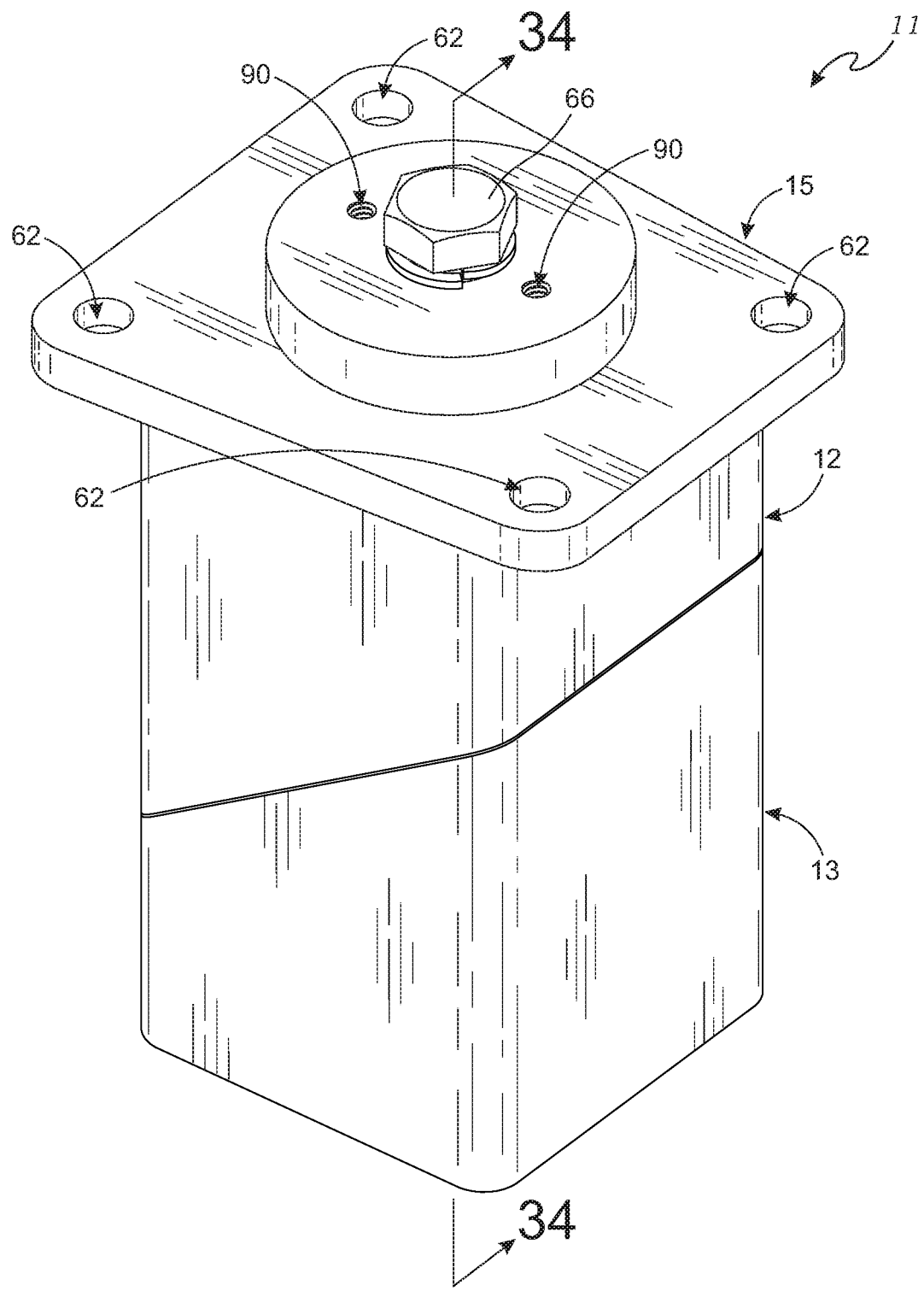
FIG. 33 is a perspective view of a further exemplary mount device, in accordance with at least one embodiment.
Figure 34:
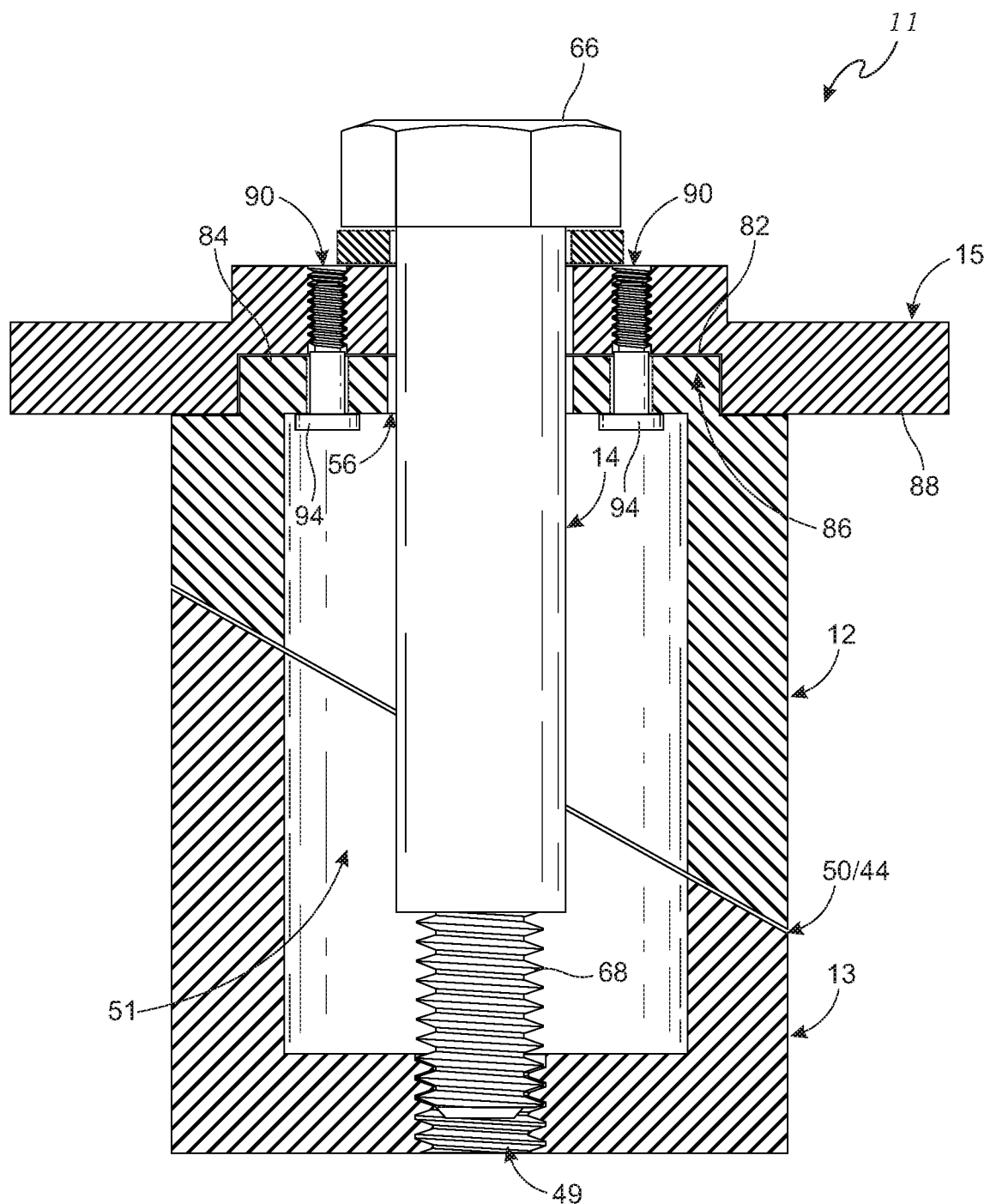
FIG. 34 is a cross-sectional view taken along line 34-34 of FIG. 33.
Figure 35:
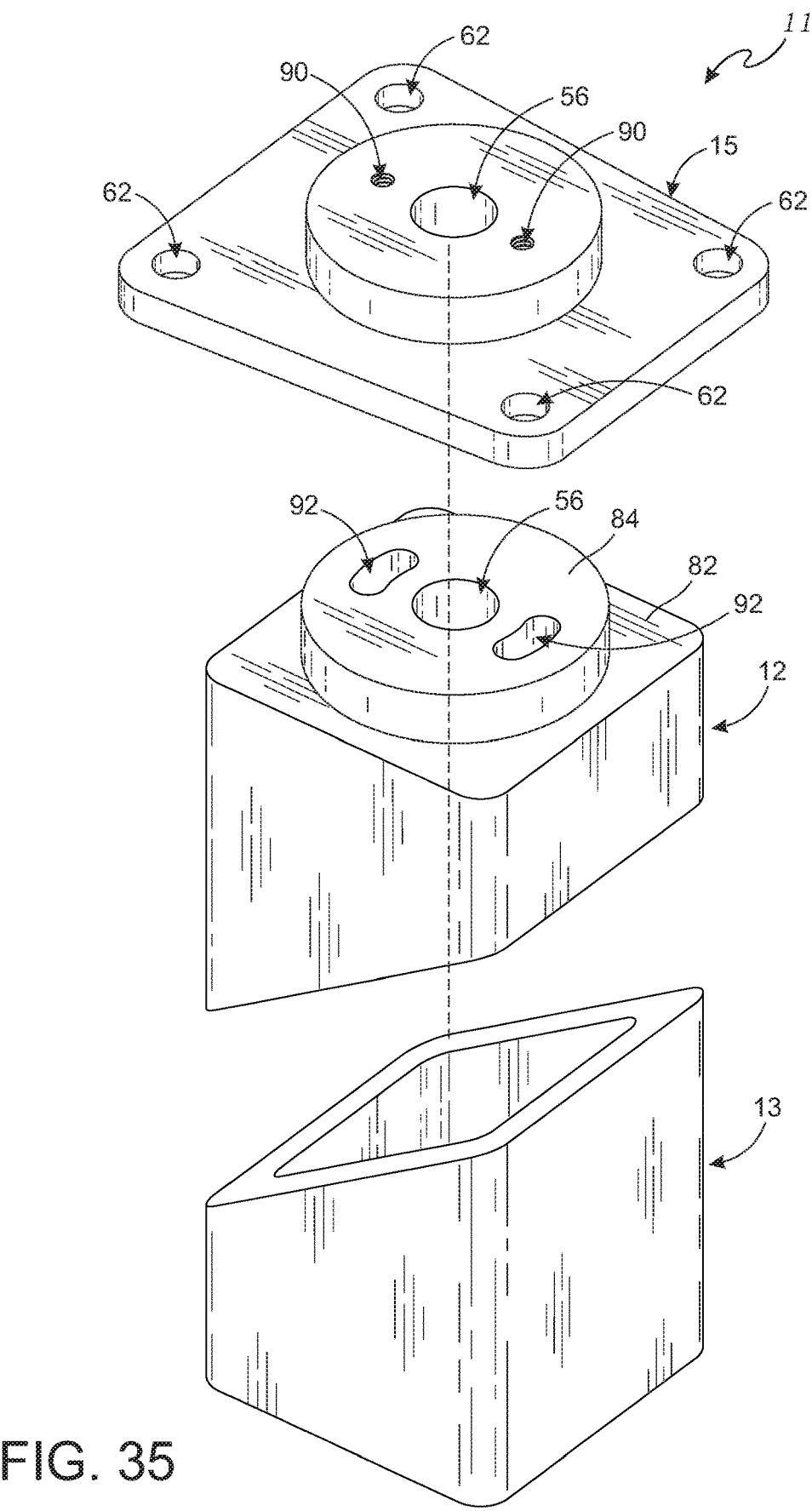
FIG. 35 is an upper perspective view of the exemplary mount device of FIG. 33, with a support plate exploded from the upper mount conduit, in accordance with at least one embodiment.
Figure 36:
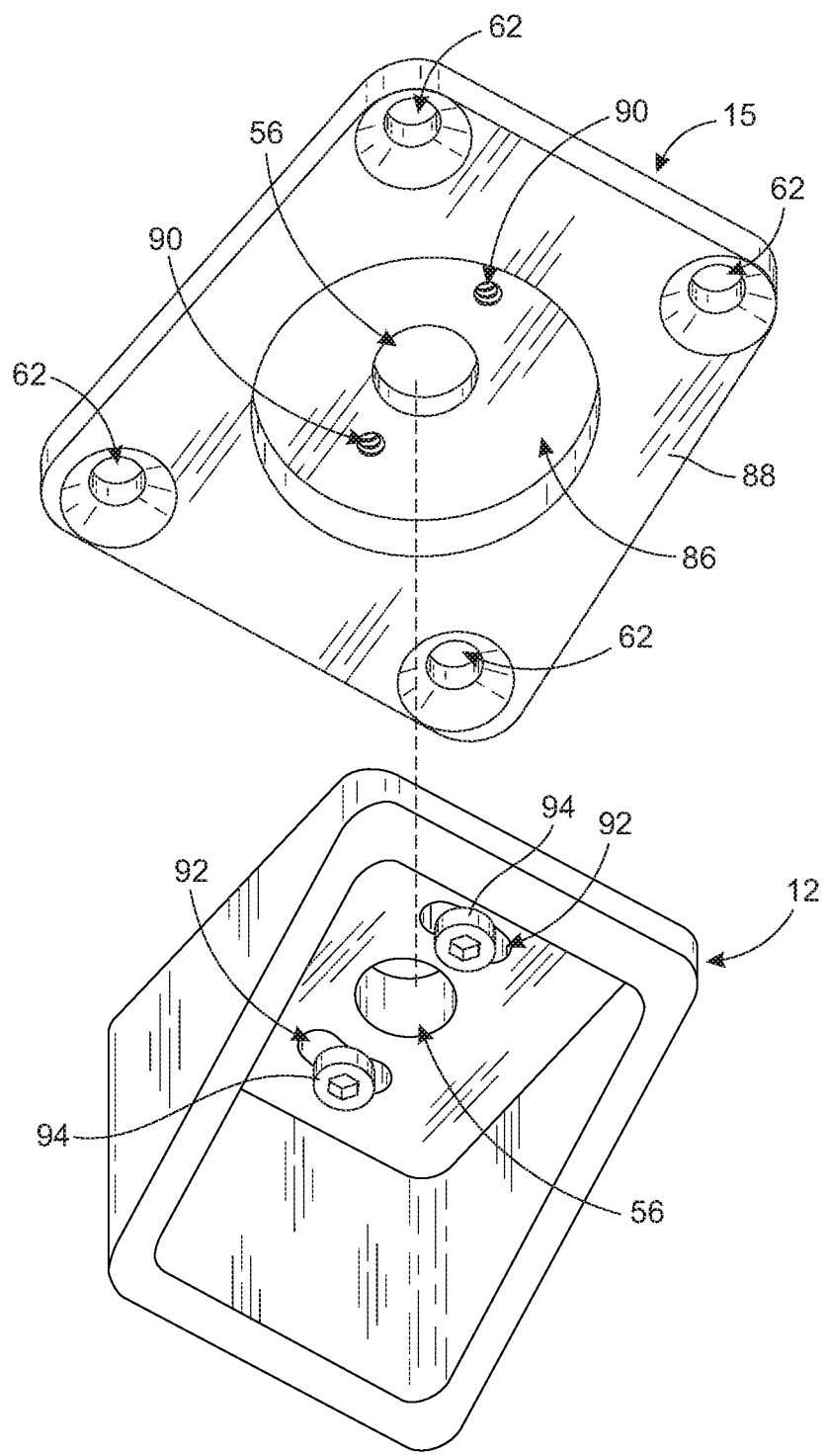
FIG. 36 is a lower perspective view thereof, with the lower mount conduit omitted for illustrative purposes, in accordance with at least one embodiment.

FIG. 32 is an alternate embodiment of the invention similar in structure and function of that shown in FIG. 23, but the bolt 14c is fixed against rotating in the lower mount conduit 13 by a flange 68d extending from end 68 into notched opening 49c. Bolt 14c then extends upward with accessible threads at upper end 68c above a support plate 15 in the upper mount conduit 12. Threaded nut 66c is applied to threads of upper end 68c, whereby rotating nut 66c in a clockwise direction causes bolt 14c to be drawn upward, urging the interface surfaces of upper mount conduit 12 and lower mount conduit 13 to slide across each other and force their long sides horizontally outward to engage an inside surface of a receiver conduit.

It is within the objects of the invention to provide more than one mount device 11 for a starting block. Further, rotation means comprise threaded ends of a bolt to engage with a lower mount conduit 13 or for a threaded connection to a nut or similar device to be made above the upper mount conduit 12 as in FIG. 32.

In at least one further embodiment, as illustrated in FIGS. 33-36, the support plate 15 is rotatably engagable with the upper mount conduit 12. In at least one such embodiment, a top surface 82 of the upper mount conduit 12 provides a circular boss 84 sized and configured for being inserted into a corresponding recess 86 on a bottom surface 88 of the support plate 15. In at least one embodiment, each of the boss 84 and corresponding recess 86 have a slight taper for strengthening the engagement therebetween. Similar to the other embodiments discussed herein, both the support plate 15 and the upper mount conduit 12 provide a substantially centrally positioned, linearly aligned bolt slot 56 that has a relatively larger diameter than that of the threaded bolt 14 that extends therethrough. Additionally, in at least one such embodiment, the support plate 15 provides a pair of holes 90 that flank the bolt slot 56, while the upper mount conduit 12 provides a corresponding pair of arcuate slots 92, with each of the arcuate slots 92 being linearly aligned with one of the holes 90 in the support plate 15. In at least one such embodiment, a pair of threaded bolts 94 extend through the arcuate slots 92 and thread into the corresponding holes 90 in the support plate 15. In this way, the threaded bolts 94 maintain engagement between the support plate 15 and the upper mount conduit 12, while also allowing the support plate 15 (and, in turn, the starting block 10 when engaged with the mount device 11 via the support plate 15) to selectively rotate along a restricted path as defined by the arcuate slots 92 in the upper mount conduit 12. In at least one such embodiment, this selective rotation allows the starting block 10 to be finely adjusted (after the mount device 11 has been engaged with the starting block 10, inserted into receiver conduit 39 of the floor 36 and frictionally engaged therewithin) in order to better ensure the starting block 10 it is squarely oriented relative to an edge of the pool. In at least one further alternate embodiment (not shown), the pair of holes 90 are positioned in the upper mount conduit 12 (rather than the support plate 15), while the corresponding pair of arcuate slots 92 are positioned on the support plate 15 (rather than the upper mount conduit 12), with the pair of threaded bolts 94 extending through the arcuate slots 92 and threading into the corresponding holes 90 in the upper mount conduit 12.

In at least one further alternate embodiment (not shown), the bottom surface 88 of the support plate 15 provides a pair of downwardly extending pins positioned and configured for extending through the pair of arcuate slots 92 provided by the upper mount conduit 12, thereby allowing the support plate 15 (and, in turn, the starting block 10 when engaged with the mount device 11 via the support plate 15) to selectively rotate along a restricted path as defined by the arcuate slots 92 in the upper mount conduit 12. In at least one further alternate embodiment (not shown), upper mount conduit 12 provides a pair of upwardly extending pins positioned and configured for extending through a pair of arcuate slots 92 provided by the support plate 15. In still further alternate embodiments, any other mechanism or combination of mechanisms (now known or later developed) capable of achieving a restricted rotational engagement between the support plate 15 and the upper mount conduit 12 may be substituted.

Aspects of the present specification may also be described as the following embodiments:

1. A mount device for securing a swimming starting block to a floor of a pool deck, the starting block comprising a diving platform supported underneath by a support structure, the mount device comprising: an upper mount conduit having an outer diameter or width sized for at least partially extending into an upwardly opening receiver conduit provided by the floor, an upper end of the upper mount conduit providing a support plate rigidly engagable with the support structure of the starting block, thereby preventing the starting block from unintentionally rotating relative to the upper mount conduit; a lower mount conduit positioned below the upper mount conduit and having an outer diameter or width sized for being completely positioned within the receiver conduit; an expansion bolt having a shaft that extends through a respective substantially coaxially aligned bore of each of the upper mount conduit and the lower mount conduit, each of the bores having a diameter that is relatively larger than a diameter the shaft; and the upper mount conduit and lower mount conduit being generally aligned end to end with a common axis, forming an angled interface between the upper mount conduit and the lower mount conduit, along with opposing long outside surfaces of each of the upper mount conduit and lower mount conduit; whereby, upon tightening the expansion bolt, the lower mount conduit is urged along the common axis toward the upper mount conduit, such that the opposing long outside surfaces of the upper mount conduit and lower mount conduit are urged in opposite, substantially horizontal directions, thereby creating a frictional engagement with an inside wall of the receiver conduit.

2. The mount device according to embodiment 1, wherein the angled interface is from 30 to 75 degrees relative to the generally common axis.

3. The mount device according to embodiments 1-2, further comprising a rotation means connected with the expansion bolt above a top end of the upper mount conduit, the rotation means capable of being selectively rotated for causing the lower mount conduit to be urged along the common axis toward the upper mount conduit.

4. The mount device according to embodiments 1-3, wherein the rotation means comprises a head of the expansion bolt that causes rotation of a threaded shaft of the expansion bolt, whereby threads of the shaft are engaged with a threaded bore in the lower mount conduit.

5. The mount device according to embodiments 1-4, wherein the rotation means comprises a threaded shaft of the expansion bolt fixed against rotation in the lower mount conduit and extending upward through and above a top, distal end of the upper mount conduit, whereby threads of the shaft are engaged by a threaded nut.

6. The mount device according to embodiments 1-5, wherein the upper mount conduit and lower mount conduit are, in horizontal cross section, round, square or polygonal.

7. The mount device according to embodiments 1-6, further comprising a rotation means connected with the expansion bolt above a top end of the upper mount conduit, the rotation means capable of being selectively rotated for causing the lower mount conduit to be urged along the common axis toward the upper mount conduit.

8. The mount device according to embodiments 1-7, wherein the upper end of the upper mount conduit provides a further plate positioned above the support plate and configured for being rigidly connected to the support plate, with a base plate of the support structure of the starting block rigidly sandwiched between the support plate and the further plate.

9. The mount device according to embodiments 1-8, wherein the support plate is sized for being received within a corresponding cutout in the floor of the pool deck, thereby allowing a top surface of the support plate to be substantially flush with the floor.

10. The mount device according to embodiments 1-9, further comprising: an internal space formed substantially between the upper mount conduit and lower mount conduit; and a relatively resilient support insert frictionally positioned within the internal space for interconnecting the upper mount conduit and lower mount conduit, the support insert configured for selectively collapsing as the opposing long outside surfaces of the upper mount conduit and lower mount conduit are urged in opposite, substantially horizontal directions.

11. The mount device according to embodiments 1-10, wherein the support insert provides a longitudinal slot positioned and configured for assisting the support insert in selectively collapsing as the opposing long outside surfaces of the upper mount conduit and lower mount conduit are urged in opposite, substantially horizontal directions.

12. A combination mount device and swimming starting block comprising: a starting block comprising a diving platform supported underneath by a support structure; and a mount device configured for securing the starting block to a floor of a pool deck, the mount device comprising: an upper mount conduit having an outer diameter or width sized for at least partially extending into an upwardly opening receiver conduit provided by the floor, an upper end of the upper mount conduit providing a support plate rigidly engagable with the support structure of the starting block, thereby preventing the starting block from unintentionally rotating relative to the upper mount conduit; a lower mount conduit positioned below the upper mount conduit and having an outer diameter or width sized for being completely positioned within the receiver conduit; an expansion bolt having a shaft that extends through a respective substantially coaxially aligned bore of the upper mount conduit and the lower mount conduit, each of the bores having a diameter that is relatively larger than a diameter the shaft; and the upper mount conduit and lower mount conduit being generally aligned end to end with a common axis, forming an angled interface between the upper mount conduit and the lower mount conduit along with opposing long outside surfaces of each of the upper mount conduit and lower mount conduit; whereby, upon tightening the expansion bolt, the lower mount conduit is urged along the common axis toward the upper mount conduit, such that the opposing long outside surfaces of the upper mount conduit and lower mount conduit are urged in opposite, substantially horizontal directions, thereby creating a frictional engagement with an inside wall of the receiver conduit.

13. The combination mount device and swimming starting block according to embodiment 12, wherein the support structure is a hollow fiberglass shell.

14. The combination mount device and swimming starting block according to embodiments 12-13, wherein the support structure comprises primarily metal conduits.

15. A mount device for securing a swimming starting block to a floor of a pool deck, the starting block comprising a diving platform supported underneath by a support structure, the mount device comprising: a support plate configured for being rigidly connected to the support structure of the starting block, a bottom surface of the support plate providing a circular recess; an upper mount conduit providing an upwardly extending boss positioned and configured for being rotatably engaged along a restricted path within the recess of the support plate, the upper mount conduit having an outer diameter or width sized for at least partially extending into an upwardly opening receiver conduit provided by the floor; a lower mount conduit positioned below the upper mount conduit and having an outer diameter or width sized for being completely positioned within the receiver conduit; an expansion bolt having a shaft that extends through a respective substantially coaxially aligned bore of each of the support plate, the upper mount conduit and the lower mount conduit, each of the bores having a diameter that is relatively larger than a diameter the shaft; and the upper mount conduit and lower mount conduit being generally aligned end to end with a common axis, forming an angled interface between the upper mount conduit and the lower mount conduit, along with opposing long outside surfaces of each of the upper mount conduit and lower mount conduit; whereby, upon tightening the expansion bolt, the lower mount conduit is urged along the common axis toward the upper mount conduit, such that the opposing long outside surfaces of the upper mount conduit and lower mount conduit are urged in opposite, substantially horizontal directions, thereby creating a frictional engagement with an inside wall of the receiver conduit.

16. The mount device according to embodiment 15, wherein each of the boss and corresponding recess are tapered for strengthening the engagement therebetween.

17. The mount device according to embodiments 15-16, wherein: the support plate provides a pair of holes that flank the bore of the support plate; the upper mount conduit provides a corresponding pair of arcuate slots that flank the bore of the upper mount conduit, with each of the arcuate slots being linearly aligned with a one of the holes in the support plate; and a pair of threaded bolts extend through the arcuate slots and thread into the corresponding holes in the support plate; whereby, the threaded bolts maintain engagement between the support plate and the upper mount conduit, while also allowing the support plate—and, in turn, the starting block—to selectively rotate relative to the upper mount conduit along a restricted path as defined by the arcuate slots in the upper mount conduit.

18. The mount device according to embodiments 15-17, wherein: the upper mount conduit provides a pair of holes that flank the bore of the upper mount conduit; the support plate provides a corresponding pair of arcuate slots that flank the bore of the support plate, with each of the arcuate slots being linearly aligned with a one of the holes in the upper mount conduit; and a pair of threaded bolts extend through the arcuate slots and thread into the corresponding holes in the upper mount conduit; whereby, the threaded bolts maintain engagement between the support plate and the upper mount conduit, while also allowing the support plate—and, in turn, the starting block—to selectively rotate relative to the upper mount conduit along a restricted path as defined by the arcuate slots in the support plate.

19. The mount device according to embodiments 15-18, wherein: the upper mount conduit provides a pair of arcuate slots that flank the bore of the upper mount conduit; and the support plate provides a corresponding pair of downwardly extending pins that flank the bore of the support plate, with each of the pins extending through a corresponding one of the arcuate slots in the upper mount conduit; whereby, the pins allow the support plate—and, in turn, the starting block—to selectively rotate relative to the upper mount conduit along a restricted path as defined by the arcuate slots in the upper mount conduit.

20. The mount device according to embodiments 15-19, wherein: the support plate provides a pair of arcuate slots that flank the bore of the support plate; and the upper mount conduit provides a corresponding pair of upwardly extending pins that flank the bore of the upper mount conduit, with each of the pins extending through a corresponding one of the arcuate slots in the support plate; whereby, the pins allow the support plate—and, in turn, the starting block—to selectively rotate relative to the upper mount conduit along a restricted path as defined by the arcuate slots in the upper mount conduit.

21. The mount device according to embodiments 15-20, wherein the angled interface is from 30 to 75 degrees relative to the generally common axis.

22. The mount device according to embodiments 15-21, further comprising a rotation means connected with the expansion bolt above a top end of the upper mount conduit, the rotation means capable of being selectively rotated for causing the lower mount conduit to be urged along the common axis toward the upper mount conduit.

23. The mount device according to embodiments 15-22, wherein the rotation means comprises a head of the expansion bolt that causes rotation of a threaded shaft of the expansion bolt, whereby threads of the shaft are engaged with a threaded bore in the lower mount conduit.

24. The mount device according to embodiments 15-23, wherein the rotation means comprises a threaded shaft of the expansion bolt fixed against rotation in the lower mount conduit and extending upward through and above a top, distal end of the upper mount conduit, whereby threads of the shaft are engaged by a threaded nut.

25. The mount device according to embodiments 15-24, wherein the upper mount conduit and lower mount conduit are, in horizontal cross section, round, square or polygonal.

26. The mount device according to embodiments 15-25, further comprising a rotation means connected with the expansion bolt above a top end of the upper mount conduit, the rotation means capable of being selectively rotated for causing the lower mount conduit to be urged along the common axis toward the upper mount conduit.

27. The mount device according to embodiments 15-26, wherein the upper end of the upper mount conduit provides a further plate positioned above the support plate and configured for being rigidly connected to the support plate, with a base plate of the support structure of the starting block rigidly sandwiched between the support plate and the further plate.

28. The mount device according to embodiments 15-27, wherein the support plate is sized for being received within a corresponding cutout in the floor of the pool deck, thereby allowing a top surface of the support plate to be substantially flush with the floor.

29. The mount device according to embodiments 15-28, further comprising: an internal space formed substantially between the upper mount conduit and lower mount conduit; and a relatively resilient support insert frictionally positioned within the internal space for interconnecting the upper mount conduit and lower mount conduit, the support insert configured for selectively collapsing as the opposing long outside surfaces of the upper mount conduit and lower mount conduit are urged in opposite, substantially horizontal directions.

30. The mount device according to embodiments 15-29, wherein the support insert provides a longitudinal slot positioned and configured for assisting the support insert in selectively collapsing as the opposing long outside surfaces of the upper mount conduit and lower mount conduit are urged in opposite, substantially horizontal directions.

In closing, regarding the exemplary embodiments of the present invention as shown and described herein, it will be appreciated that a mount device is disclosed and configured for simplifying the installation and removal of a swimming starting block from a pool deck or similar surface. Because the principles of the invention may be practiced in a number of configurations beyond those shown and described, it is to be understood that the invention is not in any way limited by the exemplary embodiments, but is generally directed to a mount device and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A mount device for securing a swimming starting block to a floor of a pool deck, the starting block comprising a diving platform supported underneath by a support structure, the mount device comprising:
an upper mount conduit having an outer diameter or width sized for at least partially extending into an upwardly opening receiver conduit provided by the floor, an upper end of the upper mount conduit providing a support plate rigidly engagable with the support structure of the starting block, thereby preventing the starting block from unintentionally rotating relative to the upper mount conduit;

a lower mount conduit positioned below the upper mount conduit and having an outer diameter or width sized for being completely positioned within the receiver conduit;

an expansion bolt having a shaft that extends through a respective substantially coaxially aligned bore of each of the upper mount conduit and the lower mount conduit, each of the bores having a diameter that is relatively larger than a diameter the shaft;

the upper mount conduit and lower mount conduit being generally aligned end to end with a common axis, forming an angled interface between the upper mount conduit and the lower mount conduit, along with opposing long outside surfaces of each of the upper mount conduit and lower mount conduit; and a rotation means connected with the expansion bolt above a top end of the upper mount conduit, the rotation means capable of being selectively rotated for causing the lower mount conduit to be urged along the common axis toward the upper mount conduit;

whereby, upon tightening the expansion bolt via the rotation means, the lower mount conduit is urged along the common axis toward the upper mount conduit, such that the opposing long outside surfaces of the upper mount conduit and lower mount conduit are urged in opposite, substantially horizontal directions, thereby creating a frictional engagement with an inside wall of the receiver conduit.

2. The mount device of claim 1, wherein the rotation means comprises a head of the expansion bolt that causes rotation of a threaded shaft of the expansion bolt, whereby threads of the shaft are engaged with a threaded bore in the lower mount conduit.

3. The mount device of claim 1, wherein the rotation means comprises a threaded shaft of the expansion bolt fixed against rotation in the lower mount conduit and extending upward through and above a top, distal end of the upper mount conduit, whereby threads of the shaft are engaged by a threaded nut.

4. The mount device of claim 1, wherein the upper end of the upper mount conduit provides a further plate positioned above the support plate and configured for being rigidly connected to the support plate, with a base plate of the support structure of the starting block rigidly sandwiched between the support plate and the further plate.

5. The mount device of claim 1, wherein the support plate is sized for being received within a corresponding cutout in the floor of the pool deck, thereby allowing a top surface of the support plate to be substantially flush with the floor.

6. The mount device of claim 1, further comprising:
an internal space formed substantially between the upper mount conduit and lower mount conduit; and
a relatively resilient support insert frictionally positioned within the internal space for interconnecting the upper mount conduit and lower mount conduit, the support insert configured for selectively collapsing as the opposing long outside surfaces of the upper mount conduit and lower mount conduit are urged in opposite, the substantially horizontal directions.

7. The mount device of claim 6, wherein the support insert provides a longitudinal slot positioned and configured for assisting the support insert in selectively collapsing as the opposing long outside surfaces of the upper mount conduit and lower mount conduit are urged in opposite, the substantially horizontal directions.

8. A combination mount device and swimming starting block comprising:
a starting block comprising a diving platform supported underneath by a support structure; and
a mount device configured for securing the starting block to a floor of a pool deck, the mount device comprising:
an upper mount conduit having an outer diameter or width sized for at least partially extending into an upwardly opening receiver conduit provided by the floor, an upper end of the upper mount conduit providing a support plate rigidly engagable with the support structure of the starting block, thereby preventing the starting block from unintentionally rotating relative to the upper mount conduit;
a lower mount conduit positioned below the upper mount conduit and having an outer diameter or width sized for being completely positioned within the receiver conduit;
an expansion bolt having a shaft that extends through a respective substantially coaxially aligned bore of the upper mount conduit and the lower mount conduit, each of the bores having a diameter that is relatively larger than a diameter the shaft; and
the upper mount conduit and lower mount conduit being generally aligned end to end with a common axis, forming an angled interface between the upper mount conduit and the lower mount conduit along with opposing long outside surfaces of each of the upper mount conduit and lower mount conduit;
whereby, upon tightening the expansion bolt, the lower mount conduit is urged along the common axis toward the upper mount conduit, such that the opposing long outside surfaces of the upper mount conduit and lower mount conduit are urged in opposite, substantially horizontal directions, thereby creating a frictional engagement with an inside wall of the receiver conduit.

9. A mount device for securing a swimming starting block to a floor of a pool deck, the starting block comprising a diving platform supported underneath by a support structure, the mount device comprising:
a support plate configured for being rigidly connected to the support structure of the starting block, a bottom surface of the support plate providing a circular recess;
an upper mount conduit providing an upwardly extending boss positioned and configured for being rotatably engaged along a restricted path within the recess of the support plate, the upper mount conduit having an outer diameter or width sized for at least partially extending into an upwardly opening receiver conduit provided by the floor;
a lower mount conduit positioned below the upper mount conduit and having an outer diameter or width sized for being completely positioned within the receiver conduit;
an expansion bolt having a shaft that extends through a respective substantially coaxially aligned bore of each of the support plate, the upper mount conduit and the lower mount conduit, each of the bores having a diameter that is relatively larger than a diameter the shaft; and
the upper mount conduit and lower mount conduit being generally aligned end to end with a common axis, forming an angled interface between the upper mount conduit and the lower mount conduit, along with opposing long outside surfaces of each of the upper mount conduit and lower mount conduit;

whereby, upon tightening the expansion bolt, the lower mount conduit is urged along the common axis toward the upper mount conduit, such that the opposing long outside surfaces of the upper mount conduit and lower mount conduit are urged in opposite, substantially horizontal directions, thereby creating a frictional engagement with an inside wall of the receiver conduit.

10. The mount device of claim 9, wherein each of the boss and corresponding recess are tapered for strengthening the engagement therebetween.

11. The mount device of claim 9, wherein:
the support plate provides a pair of holes that flank the bore of the support plate; the upper mount conduit provides a corresponding pair of arcuate slots that flank the bore of the upper mount conduit, with each of the arcuate slots being linearly aligned with a one of the holes in the support plate; and
a pair of threaded bolts extend through the arcuate slots and thread into the corresponding holes in the support plate;
whereby, the threaded bolts maintain engagement between the support plate and the upper mount conduit, while also allowing the support plate and, in turn, the starting block to selectively rotate relative to the upper mount conduit along a restricted path as defined by the arcuate slots in the upper mount conduit.

12. The mount device of claim 9, further comprising a rotation means connected with the expansion bolt above a top end of the upper mount conduit, the rotation means capable of being selectively rotated for causing the lower mount conduit to be urged along the common axis toward the upper mount conduit.

13. The mount device of claim 12, wherein the rotation means comprises a head of the expansion bolt that causes rotation of a threaded shaft of the expansion bolt, whereby threads of the shaft are engaged with a threaded bore in the lower mount conduit.

14. The mount device of claim 12, wherein the rotation means comprises a threaded shaft of the expansion bolt fixed against rotation in the lower mount conduit and extending upward through and above a top, distal end of the upper mount conduit, whereby threads of the shaft are engaged by a threaded nut.

15. The mount device of claim 9, further comprising a rotation means connected with the expansion bolt above a top end of the upper mount conduit, the rotation means capable of being selectively rotated for causing the lower mount conduit to be urged along the common axis toward the upper mount conduit.

16. The mount device of claim 9, wherein an upper end of the upper mount conduit provides a further plate positioned above the support plate and configured for being rigidly connected to the support plate, with a base plate of the support structure of the starting block rigidly sandwiched between the support plate and the further plate.

17. The mount device of claim 9, wherein the support plate is sized for being received within a corresponding cutout in the floor of the pool deck, thereby allowing a top surface of the support plate to be substantially flush with the floor.

18. The mount device of claim 9, further comprising:
an internal space formed substantially between the upper mount conduit and lower mount conduit; and
a relatively resilient support insert frictionally positioned within the internal space for interconnecting the upper mount conduit and lower mount conduit, the support insert configured for selectively collapsing as the opposing long outside surfaces of the upper mount conduit and lower mount conduit are urged in opposite, substantially horizontal directions.

* * * * *